(12) United States Patent
Jin

(10) Patent No.: US 10,296,671 B2
(45) Date of Patent: May 21, 2019

(54) METHOD OF AND APPARATUS FOR PERFORMING SIMULATION USING PLURALITY OF PROCESSORS IN PARALLEL

(71) Applicant: SAMSUNG ELECTRONICS CO., LTD., Suwon-si, Gyeonggi-do (KR)

(72) Inventor: Tai-song Jin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 951 days.

(21) Appl. No.: 14/521,656

(22) Filed: Oct. 23, 2014

(65) Prior Publication Data
US 2015/0112662 A1 Apr. 23, 2015

(30) Foreign Application Priority Data
Oct. 23, 2013 (KR) .................... 10-2013-0126705

(51) Int. Cl.
*G06F 17/50* (2006.01)

(52) U.S. Cl.
CPC ...... *G06F 17/5009* (2013.01); *G06F 2217/04* (2013.01)

(58) Field of Classification Search
None
See application file for complete search history.

(56) References Cited

U.S. PATENT DOCUMENTS

| | | | | |
|---|---|---|---|---|
| 6,816,828 | B1* | 11/2004 | Ikegami | G06F 17/5022 703/13 |
| 6,983,234 | B1* | 1/2006 | Hangal | G06F 17/5022 703/13 |
| 8,543,367 | B1* | 9/2013 | Van Rompaey | G06F 17/5031 703/14 |
| 2007/0192079 | A1* | 8/2007 | Rompaey | G06F 11/3457 703/19 |
| 2013/0013283 | A1 | 1/2013 | Gam | |
| 2013/0275585 | A1* | 10/2013 | Santhanakrishnan | G06F 11/3476 709/224 |

* cited by examiner

*Primary Examiner* — Syed A Roni
(74) *Attorney, Agent, or Firm* — Staas & Halsey LLP

(57) ABSTRACT

A method and apparatus for performing a simulation by using a plurality of N processors in parallel include dividing the simulation scenario into N parts to distribute a simulation scenario to each of the processors; performing a high-detail simulation by using a first processor to which a part that includes a beginning part of the divided simulation scenario is distributed, from among the N processors; performing a fast simulation by using each of N−1 processors, other than the first processor; and performing a high-detail simulation based on a snapshot that is generated after the fast simulation is finished, by using each of the N−1 processors.

20 Claims, 8 Drawing Sheets

METHOD OF AND APPARATUS FOR PERFORMING SIMULATION USING PLURALITY OF PROCESSORS IN PARALLEL

CROSS-REFERENCE TO RELATED APPLICATIONS

This application claims the benefit of Korean Patent Application No. 10-2013-0126705, filed on Oct. 23, 2013, in the Korean Intellectual Property Office, the disclosure of which is incorporated herein in its entirety by reference.

BACKGROUND

1. Field

One or more embodiments relate to methods and apparatuses for performing a multipass simulation, and more particularly, to methods and apparatuses for performing a simulation by using a plurality of processors in parallel.

2. Description of the Related Art

Simulation is a tool that has been extensively used in various science and technology fields for a long period of time. Simulation is used when it is inconvenient, expensive, unrealistic, or impossible to perform a particular task in the real world. Through simulation, an experimenter may perform a task by smoothly controlling input data and parameters, and understand a result and a system state in a process of drawing a conclusion. By using simulation, experimental costs may be reduced, a development period may be shortened, and product quality may be improved. In addition, a system that has not been implemented in a real product may be used in an experiment. For the same reasons, a computer may be used to simulate other computers.

A microarchitecture simulator enables evaluation of a design before a developer implements the design. A problem of simulation is that a time for executing a simulation is much longer than a time for executing a real system. To solve such a problem, two types of simulations may be selectively used: an instruction-set simulation and a cycle accurate simulation. An instruction-set simulation simulates an operation of an instruction-set architecture of a target processor, by using a high-level programming language such as, for example, Java, formula translation/translator (FORTRAN), common business-oriented language (COBOL), pattern analysis, statistical modeling and computational learning (PASCAL), C language, list processing language (LISP), and programming in logic (Prolog), or the like. An instruction-set simulation provides a high execution speed, but only a small amount of simulation information. A cycle accurate simulation simulates microarchitecture on a cycle-by-cycle basis. A cycle accurate simulation provides a large amount of simulation information, but a comparatively low execution speed.

SUMMARY

The foregoing described problems may be overcome and/or other aspects may be achieved by one or more embodiments of methods and apparatuses for dividing a simulation scenario by a number of processors and distributing parts of the divided simulation scenario to each processor, performing a fast simulation via each processor, and based on a snapshot that is generated after the fast simulation is finished, performing a high-detail simulation via each processor.

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

According to one or more embodiments, a method of performing a simulation by using N (where the N is an integer equal to or greater than 2) processors in parallel may include: dividing a simulation scenario into N parts in order to distribute the simulation scenario to each of the processors; performing a high-detail simulation by using a first processor to which a part that may include a beginning part of the divided simulation scenario may be distributed, from among the N processors; performing a fast simulation by using each of N−1 processors, other than the first processor; and performing a high-detail simulation based on a snapshot that may be generated after the fast simulation is finished, by using each of the N−1 processors.

The simulation scenario may be a program, and the performing of the simulation may include executing the program on the processor.

The dividing of the simulation scenario into N parts may be performed so that a ratio of an $x^{th}$ part of the divided simulation scenario to the simulation scenario complies with an optimal distribution equation shown below <Optimal Distribution Equation>

$$\frac{\frac{1}{M}\left(1-\frac{1}{M}\right)^{x-1}}{1-\left(1-\frac{1}{M}\right)^{N}}$$

In the optimal distribution equation, the M may represent that the fast simulation is M times faster than the high-detail simulation.

The performing of the fast simulation may include performing the fast simulation for precedent parts, which may come before each simulation scenario part that may be distributed to each processor, from among the simulation scenario, and the performing of the high-detail simulation may include performing the high-detail simulation for each simulation scenario part, which is distributed to each of the processors, from among the simulation scenario.

The fast simulation may be an instruction-set simulation.

The high-detail simulation may be a cycle accurate simulation.

A number of the processors may be determined based on a user input.

The snapshot may be generated from data and instruction trace information that are obtained as a result of performing the instruction-set simulation.

The method may further include collecting performance information that may be obtained as a result of the performing of the high-detail simulation; and outputting the collected performance information.

The method may further include collecting performance information that may be obtained as a result of the performing of the high-detail simulation; and generating performance statistics, based on the performance information, wherein the performance statistics may include at least one from among a number of all cycles that are necessary for executing the program, an average number of cycles for executing an instruction of the program, cache miss information, and stall cycle information.

According to one or more embodiments, an apparatus for performing a simulation by using N (where the N is an integer equal to or greater than 2) processors in parallel may include an input unit for receiving an input of a simulation scenario; a controller for dividing the simulation scenario into N parts, in order to distribute the simulation scenario to each of the processors; and a simulator for performing a high-detail simulation by using a first processor to which a part, which may include a beginning part of the divided simulation scenario from among the N processors, may be distributed, performing a fast simulation by using each of N−1 processors, other than the first processor, and performing a high-detail simulation based on a snapshot that may be generated after the fast simulation is finished, by using each of the N−1 processors.

The simulation scenario may be a program, and the simulator may execute the program on the processor.

The controller may divide the simulation scenario into N parts so that a ratio of an $x^{th}$ part of the divided simulation scenario to the simulation scenario complies with an optimal distribution equation shown below <Optimal Distribution Equation>

$$\frac{\frac{1}{M}\left(1-\frac{1}{M}\right)^{x-1}}{1-\left(1-\frac{1}{M}\right)^{N}}$$

In the optimal distribution equation, the M may represent that the fast simulation is M times faster than the high-detail simulation.

The simulator may perform the fast simulation for precedent parts, which may come before each simulation scenario part that may be distributed to each processor, from among the simulation scenario, and perform the high-detail scenario for each simulation scenario part, which may be distributed to each of the processors, from among the simulation scenario.

The fast simulation may be an instruction-set simulation.

The high-detail simulation may be a cycle accurate simulation.

The snapshot may be generated from data and instruction trace information that may be obtained as a result of performing the instruction-set simulation.

The controller may collect performance information that may be obtained as a result of the performing of the high-detail simulation, and the apparatus may further include an output unit for outputting the collected performance information.

The controller may collect performance information that may be obtained as a result of the performing of the high-detail simulation; and generate performance statistics, based on the performance information, wherein the performance statistics may include at least one from among a number of all cycles that are necessary for executing the program, an average number of cycles for executing an instruction of the program, cache miss information, and stall cycle information.

According to one or more embodiments, a non-transitory computer-readable storage medium having stored thereon a computer program, which when executed by a computer, may perform the method.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
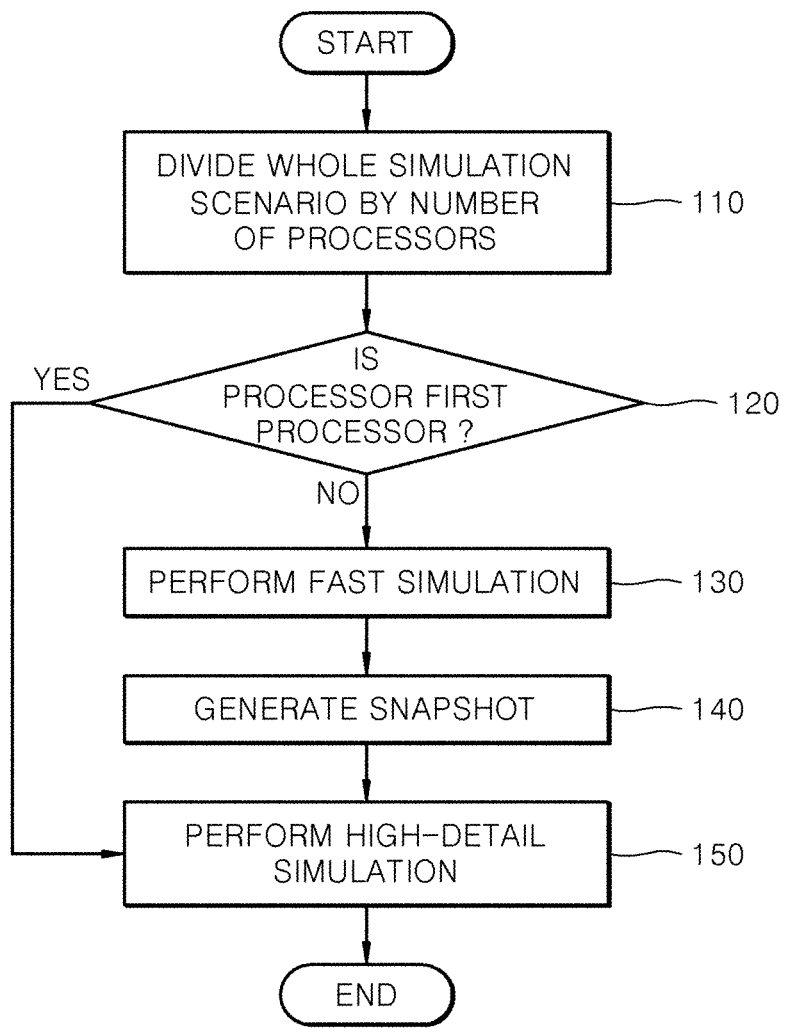
FIG. 1 is a flowchart of a method of executing a simulation by using a plurality of processors in parallel, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

FIG. 1 is a flowchart of a method of executing a simulation by using a plurality of processors in parallel, according to one or more embodiments.

In operation 110, a simulation scenario may be divided into N parts, so as to distribute each part of the divided simulation scenario to each of N processors (where N is an integer equal to or greater than two).

According to one or more embodiments, a simulation scenario may be divided into equal parts, and the parts of the divided simulation scenario may be respectively distributed to each processor. According to one or more embodiments, a simulation scenario may be divided according to an optimal distribution equation that will be described later. This will be described in detail with reference to FIG. 5.

According to one or more embodiments, a number of processors to be used for the simulation may be determined based on a user input.

In operation 120, whether a processor that is being executed is a first processor to which a part, which may include a beginning part of the divided simulation scenario, is distributed, may be determined.

As a result of the determining, if the processor that is being executed is the first processor to which the part, which may include the beginning part of the divided simulation scenario, is distributed, operation 150 may be performed so that a high-detail simulation may be performed. As a result of the determining, if the processor that is being executed is not the first processor to which the part, which may include the beginning part of the divided scenario, is distributed, operation 130 may be performed so that a fast simulation may be performed first.

In operation 130, a fast simulation may be performed by using each of the N−1 processors among the N processors, other than the first processor. The fast simulation may be performed for precedent simulation scenario parts, which may come before each simulation scenario part that is distributed to each processor, from among the whole simulation scenario.

According to one or more embodiments, a fast simulation may be a functional simulation such as an instruction-set simulation. For example, a program that may be executed for micro-architecture may be executed in an instruction-set simulation.

In operation 140, by using each of the N−1 processors among the N processors, other than the first processor, a snapshot may be generated after the fast simulation is finished.

According to one or more embodiments, each snapshot may include an overall state of the simulation at a particular point of time, but is not limited thereto. For example, a snapshot may include one or more modified register values and memory locations and areas.

If the fast simulation is an instruction-set simulation, a snapshot may be generated from data and instruction trace information that may be obtained by performing the instruction-set simulation.

According to one or more embodiments, a program that may be executed when the fast simulation is performed may interwork with an external entity. For example, a program that may be executed when the fast simulation is performed may employ an external file system or console for input or output.

In order to perform a high-detail simulation by using the N−1 processors among the N processors, other than the first processor, a fast simulation may be performed for precedent simulation scenario parts, which may come before each simulation scenario part that is distributed to each processor, from among the whole simulation scenario. As a result of the performing of the fast simulation, a snapshot may be generated. Then, based on the generated snapshot, a high-detail simulation may be performed.

In operation 150, by using each of N−1 processors, a high-detail simulation may be performed, based on the snapshot that is generated after the fast simulation is finished. A high-detail simulation may be performed from a point at which the snapshot is generated after a fast simulation may performed for precedent simulation scenario parts, which may come before each simulation scenario part that may be distributed to each processor, from among the whole simulation scenario. Additionally, a high-detail simulation may be performed for each simulation scenario part, which may be distributed to each processor, from among the whole simulation scenario.

A high-detail simulation may include, for example, a cycle accurate simulation, a pipe accurate simulation, or a register-transfer level simulation, but is not limited thereto. As a result of performing the high-detail simulation, more information may be obtained compared to a result of performing a fast simulation.

A high-detail simulation may be performed for each distributed part of the simulation scenario by using each of the processors in parallel at the same time. If the high-detail simulation is performed on all the parts of the simulation scenario, which are respectively distributed to each of the processors, each of the processors may finish the high-detail simulation.

According to one or more embodiments, performance information that may be obtained as a result of performing the high-detail simulation may be collected, and the collected information may be output. Additionally, based on the performance information, performance statistics may be generated. The performance statistics may include at least one from among a number of all cycles that may be necessary for executing the program, an average number of cycles for executing an instruction of the program, cache miss information, and stall cycle information.

According to one or more embodiments, a simulation may be efficiently used to perform debugging and maintenance for a multi-core computer or a cloud computing resource. Particularly, each processor, other than the first processor, may only need to generate one snapshot after a fast simulation is finished. Thus, generation of a snapshot may be reduced. Additionally, transmission between snapshots may be removed. Accordingly, overhead may be reduced, and simulation may be accelerated.

Figure 2:
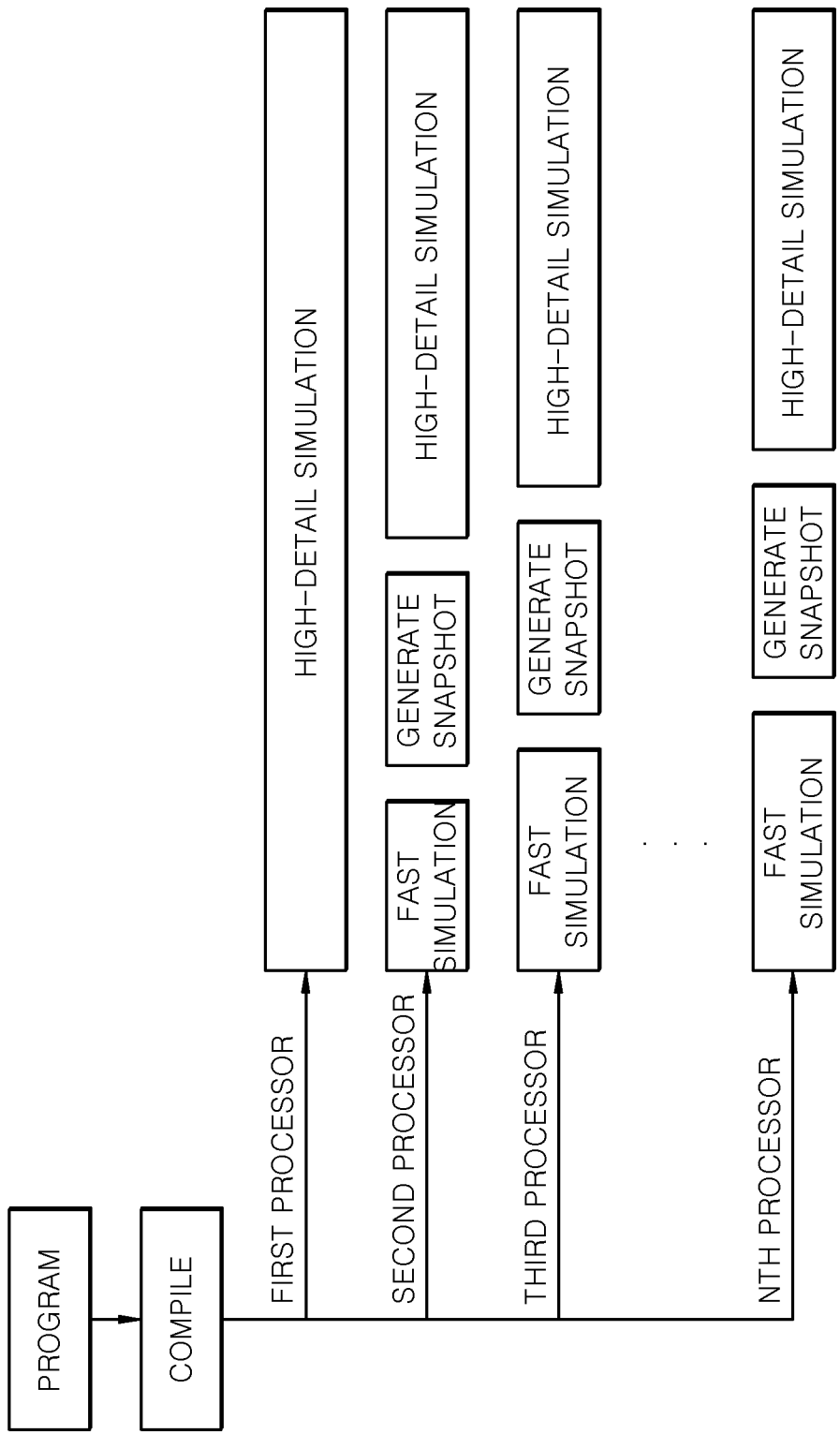
FIG. 2 a flowchart of a method of executing a simulation by using a plurality of processors in parallel, according to one or more embodiments.

FIG. 2 a flowchart of a method of executing a simulation by using a plurality of processors in parallel, according to one or more embodiments.

According to one or more embodiments, a simulation scenario may be a program. According to one or more embodiments, if an uncompiled program is received directly as a simulation input, compiling for translating the program into machine language may be performed.

A high-detail simulation may be performed by a first processor to which a beginning part of the program may be distributed.

A second processor may perform a fast simulation for a precedent part, which may come before a part of the program that may be distributed to the second processor, and may generate at least one snapshot. Based on the generated snapshot, the second processor may perform a high-detail simulation for the part of the program, which may be distributed to the second processor. After the high-detail simulation is performed for the whole distributed part of the program, the high-detail simulation may be finished.

A third processor may perform a fast simulation for precedent parts, which may come before a part of the program that may be distributed to the third processor, and may generate at least one snapshot. Based on the generated snapshot, the third processor may perform a high-detail simulation for the part of the program, which may be distributed to the third processor. After the high-detail simulation is performed for the whole distributed part of the program, the high-detail simulation may be finished.

An $n^{th}$ processor may perform a fast simulation for precedent parts, which may come before a part of the program that may be distributed to the $n^{th}$ processor, and may generate at least one snapshot. Based on the generated snapshot, the $n^{th}$ processor may perform a high-detail simulation for the part of the program, which may be distributed to the $n^{th}$ processor. After the high-detail simulation is performed for the whole distributed part of the program, the high-detail simulation may be finished.

Each of the processors may perform a simulation in parallel at the same time.

According to one or more embodiments, a program may be executed on an electronic design automation tool.

Figure 3:
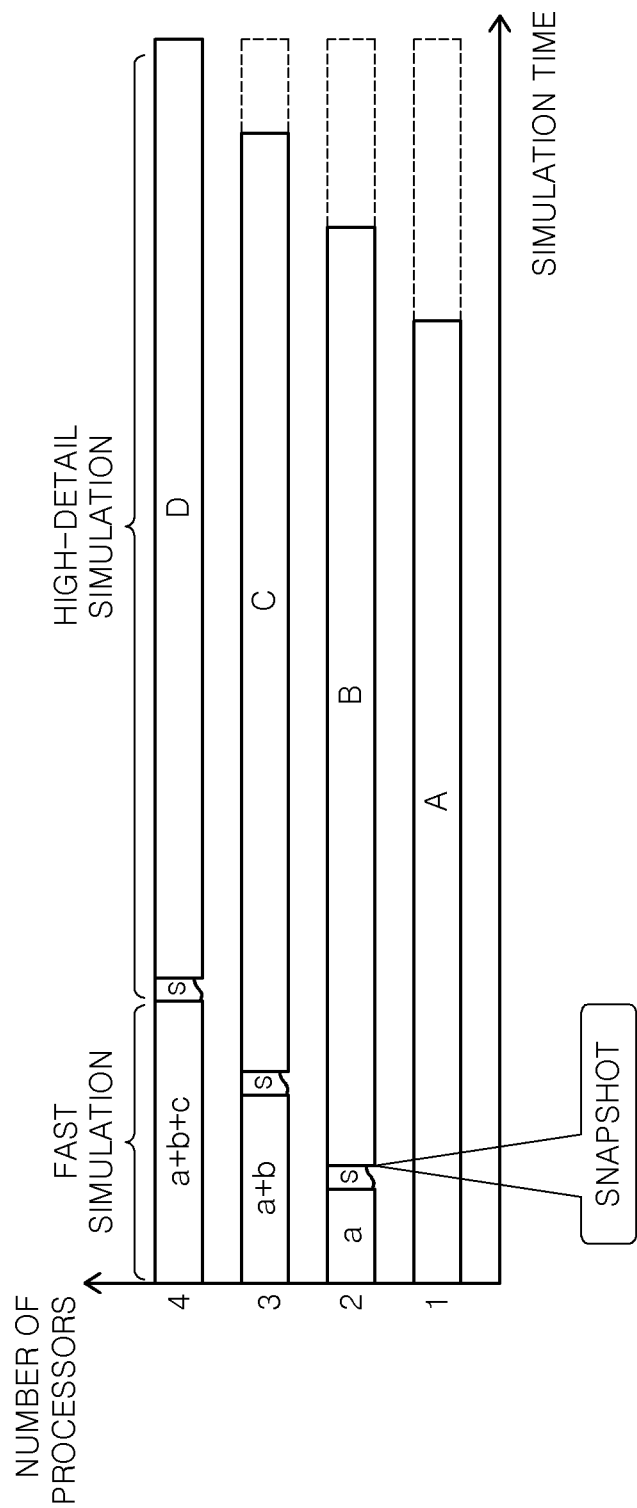
FIG. 3 an example for explaining a method of performing a simulation by using a plurality of processors in parallel, according to one or more embodiments.

FIG. 3 illustrates an example for explaining a method of performing a simulation by using a plurality of processors in parallel, according to one or more embodiments.

FIG. 3 shows that a simulation scenario may be divided into equal parts, and the divided simulation scenario may be distributed to each processor.

According to one or more embodiments, it is assumed that four processors are used for a simulation, and a fast simulation may be performed ten times faster than a high-detail simulation of a same part. Additionally, in order to compare between times for performing a simulation, a time for executing the simulation scenario by performing a fast simulation is assumed to be 1. In comparison with a whole simulation time, a time for generating a snapshot may be ignored.

A time for performing a fast simulation for a first part, from among parts that are obtained by dividing the simulation scenario into 4 equal parts, which is a number of processors, is assumed to be a. A time for performing a fast simulation for a second part thereof is assumed to be b. A time for performing a fast simulation for a third part thereof is assumed to be c. A time for performing a fast simulation for a fourth part thereof is assumed to be d. Then, since a time for executing the simulation scenario by performing a fast simulation is assumed to be 1, Equation 1 may be established as follows:

$$a=b=c=d,$$

$$a+b+c+d=1,$$

$$a=b=c=d=0.25 \qquad \text{<Equation 1>}$$

Additionally, a time for performing a high-detail simulation for the first part, from among parts that are obtained by dividing the simulation scenario into 4 equal parts, which is the number of processors, is assumed to be A. A time for performing a high-detail simulation for the second part thereof is assumed to be B. A time for performing a high-detail simulation for the third part thereof is assumed to be C. A time for performing a high-detail simulation for the fourth part thereof is assumed to be D. Then, since a fast simulation may be assumed to be ten times faster than a high-detail simulation for a same part, Equation 2 may be established as follows:

$$A=B=C=D=10\times a=2.5 \qquad \text{<Equation 2>}$$

A first processor may perform only a high-detail simulation for the first part, from among parts that are obtained by dividing the simulation scenario into 4 equal parts, which is the number of processors. Thus, a time for performing the high-detail simulation may be 2.5, as shown in Equation 3.

$$A=2.5 \qquad \text{<Equation 3>}$$

A second processor may perform a fast simulation for the first part, from among parts that are obtained by dividing the simulation scenario into 4 equal parts, which is the number of processors. Then, based on a snapshot that is generated after the performing of the fast simulation, the second processor may perform a high-detail simulation for the second part. Thus, a time for performing the simulations may be 2.75, as shown in Equation 4.

$$a+B=2.75 \qquad \text{<Equation 4>}$$

A third processor may perform a fast simulation for the first and second parts, from among parts that are obtained by dividing the simulation scenario into 4 equal parts, which is the number of processors. Then, based on a snapshot that is generated after the performing of the fast simulation, the third processor may perform a high-detail simulation for the third part. Thus, a time for performing the simulations may be 3, as shown in Equation 5.

$$a+b+C=3 \qquad \text{<Equation 5>}$$

A fourth processor may perform a fast simulation for the first through third parts, from among parts that are obtained by dividing the simulation scenario into 4 equal parts, which is the number of processors. Then, based on a snapshot that is generated after the performing of the fast simulation, the fourth processor may perform a high-detail simulation for the fourth part. Thus, a time for performing the simulation may be 3.25, as shown in Equation 6.

$$a+b+c+D=3.25 \qquad \text{<Equation 6>}$$

As a result, a time for performing the whole simulation is identical to the time for performing a simulation by using the fourth processor which finishes performing of the simulation last. Thus, the time for performing the whole simulation is 3.25.

That is, according to one or more embodiments, the method of performing a simulation may reduce the time for performing a whole simulation, and particularly, may reduce the number of snapshots that are necessary for performing a simulation which generates a high level of overhead. Additionally, since a process of transceiving a snapshot between processors is not necessary, overhead that may be generated in the process of transceiving a snapshot between processors may be removed.

Figure 4:
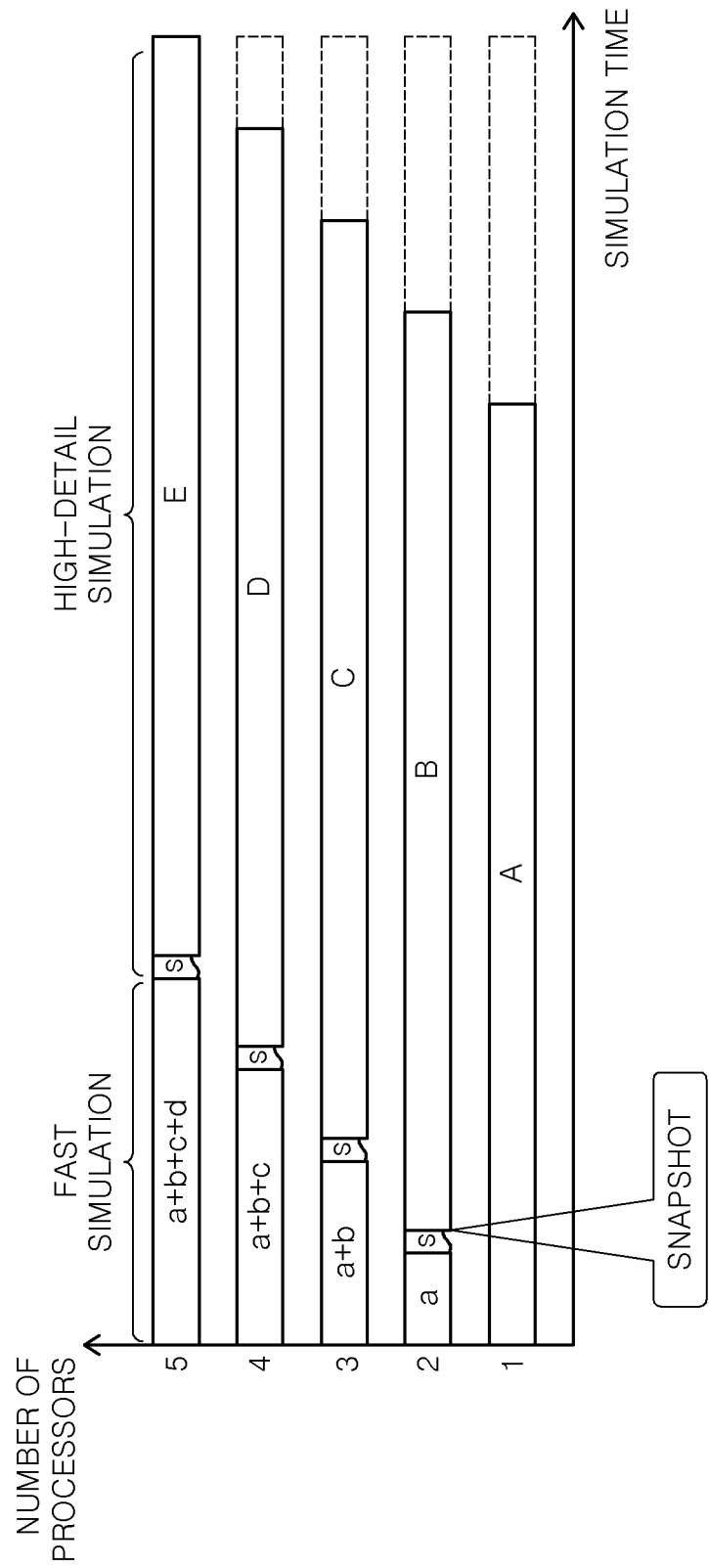
FIG. 4 illustrates a method of performing a simulation according to one or more embodiments such as the method of performing a simulation of FIG. 3, in which a number of processors that are used is increased.

FIG. 4 illustrates a method of performing a simulation according to one or more embodiments such as the method of performing a simulation of FIG. 3, in which a number of processors that are used is increased.

FIG. 4 shows that a simulation scenario may be divided into equal parts, and the divided simulation scenario may be distributed to each processor. Whereas four processors are used in FIG. 3, five processors are used in FIG. 4.

According to one or more embodiments, it is assumed that five processors are used for a simulation, and a fast simulation may be performed ten times faster than a high-detail simulation for a same part. Additionally, in order to compare between times for performing a simulation, a time for executing the simulation scenario by performing a fast simulation is assumed to be 1. In comparison with a whole simulation time, a time for generating a snapshot may be ignored.

A time for performing a fast simulation for a first part, from among parts that are obtained by dividing the simulation scenario into 5 equal parts, which is a number of processors, is assumed to be a. A time for performing a fast simulation for a second part thereof is assumed to be b. A time for performing a fast simulation for a third part thereof is assumed to be c. A time for performing a fast simulation for a fourth part thereof is assumed to be d. A time for performing a fast simulation for a fifth part thereof is assumed to be e. Then, since a time for executing the simulation scenario by performing a fast simulation is assumed to be 1, Equation 7 may be established as follows:

$$a=b=c=d=e,$$

$$a+b+c+d+e=1,$$

$$a=b=c=d=e=0.2 \qquad \text{<Equation 7>}$$

Additionally, a time for performing a high-detail simulation for the first part, from among parts that are obtained by dividing the simulation scenario into 5 equal parts, which is the number of processors, is assumed to be A. A time for performing a high-detail simulation for the second part thereof is assumed to be B. A time for performing a high-detail simulation for the third part thereof is assumed to be C. A time for performing a high-detail simulation for the fourth part thereof is assumed to be D. A time for performing a high-detail simulation for the fifth part thereof is assumed to be E. Then, since a fast simulation is assumed to be performed ten times faster than a high-detail simulation for a same part, Equation 8 may be established as follows:

$$A=B=C=D=E=10\times a=2 \qquad \text{<Equation 8>}$$

A first processor may perform only a high-detail simulation for the first part, from among parts that are obtained by dividing the simulation scenario into 5 equal parts, which is the number of processors. Thus, a time for performing the high-detail simulation may be 2, as shown in Equation 9.

$$A=2 \qquad \text{<Equation 9>}$$

A second processor may perform a fast simulation for the first part, from among parts that are obtained by dividing the simulation scenario into 5 equal parts, which is the number of processors. Then, based on a snapshot that is generated after the performing of the fast simulation, the second processor may perform a high-detail simulation for the second part. Thus, a time for performing the simulation may be 2.2, as shown in Equation 10.

$$a+B=2.2 \qquad \text{<Equation 10>}$$

A third processor may perform a fast simulation for the first and second parts, from among parts that are obtained by dividing the simulation scenario into 5 equal parts, which is the number of processors. Then, based on a snapshot that is generated after the performing of the fast simulation, the third processor may perform a high-detail simulation for the third part. Thus, a time for performing the simulation may be 2.4, as shown in Equation 11.

$$a+b+C=2.4 \qquad \text{<Equation 11>}$$

A fourth processor may perform a fast simulation for the first through third parts, from among parts that are obtained by dividing the simulation scenario into 5 equal parts, which is a number of the processors. Then, based on a snapshot that is generated after the performing of the fast simulation, the fourth processor may perform a high-detail simulation for the fourth part. Thus, a time for performing the simulation may be 2.6, as shown in Equation 12.

$$a+b+c+D=2.6 \qquad \text{<Equation 12>}$$

A fifth processor may perform a fast simulation for the first through fourth parts, from among parts that are obtained by dividing the simulation scenario into 5 equal parts, which is a number of the processors. Then, based on a snapshot that is generated after the performing of the fast simulation, the fifth processor may perform a high-detail simulation for the fifth part. Thus, a time for performing the simulation may be 2.8, as shown in Equation 13.

$$a+b+c+d+E=2.8 \qquad \text{<Equation 13>}$$

As a result, the time for performing the whole simulation is identical to the time for performing a simulation by using the fifth processor which finishes performing of the simulation last. Thus, the time for performing the whole simulation is 2.8.

That is, according to one or more embodiments, the number of processors that are used for a simulation is increased. Thus, even though a minimum number of snapshots that are necessary for performing the simulation has been increased to 4, the time for performing the whole simulation may be reduced.

Figure 5:
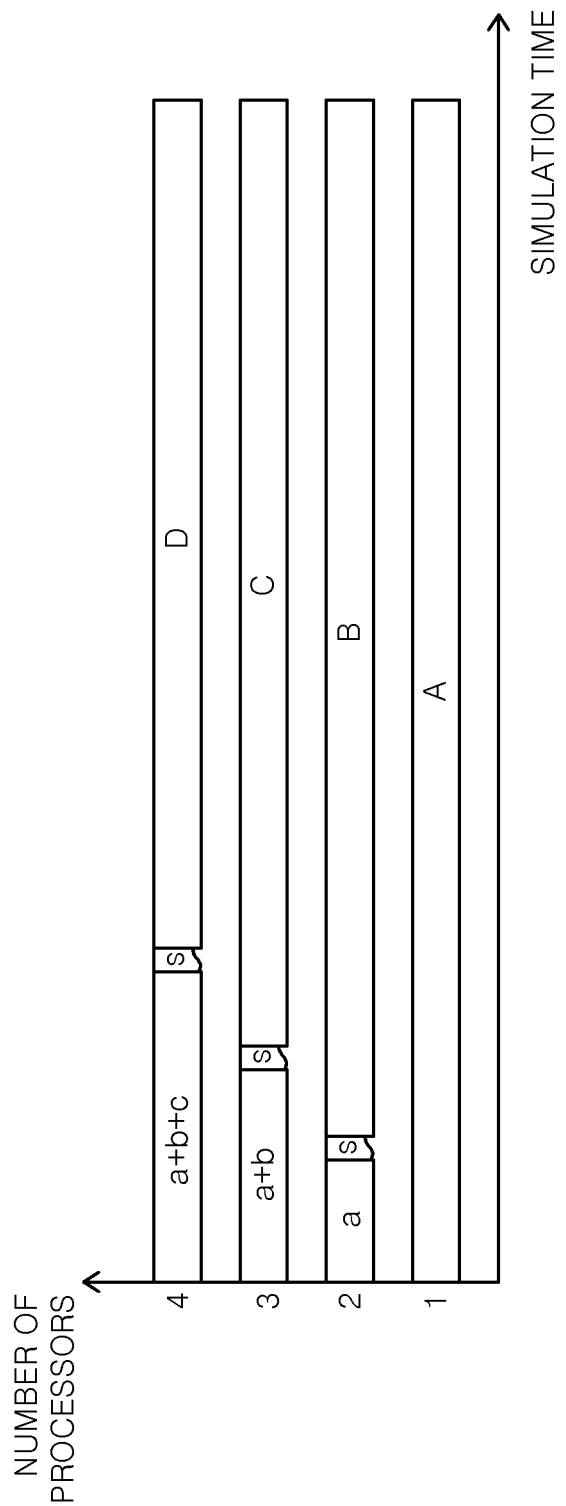
FIG. 5 illustrates an example of employing an optimal distribution equation in a method of performing a simulation according to one or more embodiments.

FIG. 5 illustrates an example of employing an optimal distribution equation in a method of performing a simulation according to one or more embodiments.

As shown in FIGS. 3 and 4, if an equal amount of divided parts of the simulation scenario is distributed to each processor, the first through n−1th processors may finish the performing of the simulation first, and thus, may wait until the $n^{th}$ processor finishes the simulation. Accordingly, by employing an optimal distribution equation so that parts of the simulation, performed by each processor, may be finished at the same time, efficiency of the simulation may be improved.

It is assumed that N processors are used for a simulation, and performing a high-detail simulation takes M times longer than performing a fast simulation for the same part. Then, a ratio of an $x^{th}$ part, from among parts that are obtained by dividing the simulation scenario by N which is the number of processors, to the simulation scenario is as presented in the <optimal distribution equation> shown below.

<Optimal Distribution Equation>

$$\frac{\frac{1}{M}\left(1-\frac{1}{M}\right)^{x-1}}{1-\left(1-\frac{1}{M}\right)^{N}}$$

In order to draw an optimal distribution equation, it is assumed that n processors are used for the simulation, and a time for executing the simulation scenario by performing a fast simulation is assumed to be 1. Then, Equation 14 may be established as follows:

$$a_1+a_2+\ldots+a_n=1 \qquad \text{<Equation 14>}$$

(where $a_x$ is a time for performing a fast simulation for an $x^{th}$ part, from among parts that are obtained by dividing the simulation scenario by n).

Additionally, if performing a high-detail simulation is assumed to take M times longer than performing a fast simulation for a same part, Equation 15 may be established as follows:

<Equation 15>

$$A_1 = M \times a_1$$
$$A_2 = M \times a_2$$
$$...$$
$$A_n = M \times a_n$$

(where $A_x$ is time for performing a high-detail simulation for an $x^{th}$ part, from among parts that are obtained by dividing the simulation scenario by n).

Then, in order to finish the simulation by using each processor at the same time, if time for performing the simulation by using each processor is assumed to be identical to each other, Equation 16 may be established as follows:

$$A_1 = a_1 + A_2 = a_1 + a_2 + A_3 = a_1 + a_2 + \ldots + a_{n-1} + A_n \quad \text{<Equation 16>}$$

Additionally, if Equation 15 is substituted for Equation 16, Equation 17 is established as follows:

$$A_n = M \times a_n M \times a_1 = a_1 + M \times a_2 = a_1 + a_2 + M \times a_3 = a_1 + a_2 + \ldots + a_{n-1} + M \times a_n \quad \text{<Equation 17>}$$

By solving a simultaneous equation that is obtained as described above, a general equation, as shown below, may be obtained and used as an optimum distribution equation.

$$\frac{\frac{1}{M}\left(1 - \frac{1}{M}\right)^{x-1}}{1 - \left(1 - \frac{1}{M}\right)^N}$$

According to one or more embodiments, in the case of employing an optimal distribution equation, a result of the performing of a simulation may be obtained. As assumed in FIG. 3, it is assumed that four processors are used for the simulation, and a fast simulation may be performed ten times faster than a high-detail simulation for a same part. Additionally, in order to compare between times for performing a simulation, a time for executing the simulation scenario by performing a fast simulation is assumed to be 1. In comparison with a whole simulation time, a time for generating a snapshot may be ignored.

A ratio of a first part, from among parts that are obtained by employing the optimal distribution equation, to the simulation scenario may be obtained by using Equation 18.

$$\frac{\frac{1}{10}\left(1 - \frac{1}{10}\right)^{1-1}}{1 - \left(1 - \frac{1}{10}\right)^4} \approx 29\% \quad \text{(Equation 18)}$$

(where M=10, N=4, and x=1 are substituted into the optimal distribution equation)

A ratio of a second part, from among parts that are obtained by employing the optimal distribution equation, to the simulation scenario may be obtained by using Equation 19.

$$\frac{\frac{1}{10}\left(1 - \frac{1}{10}\right)^{2-1}}{1 - \left(1 - \frac{1}{10}\right)^4} \approx 26\% \quad \text{(Equation 19)}$$

(where M=10, N=4, and x=2 are substituted into the optimal distribution equation)

A ratio of a third part, from among parts that are obtained by employing the optimal distribution equation, to the simulation scenario may be obtained by using Equation 20.

$$\frac{\frac{1}{10}\left(1 - \frac{1}{10}\right)^{3-1}}{1 - \left(1 - \frac{1}{10}\right)^4} \approx 24\% \quad \text{(Equation 20)}$$

(where M=10, N=4, and x=3 are substituted into the optimal distribution equation)

A ratio of a fourth part, from among parts that are obtained by employing the optimal distribution equation, to the simulation scenario may be obtained by using Equation 21.

$$\frac{\frac{1}{10}\left(1 - \frac{1}{10}\right)^{4-1}}{1 - \left(1 - \frac{1}{10}\right)^4} \approx 21\% \quad \text{(Equation 21)}$$

(where M=10, N=4, and x=4 are substituted into the optimal distribution equation)

As a result, the time for performing the whole simulation may be calculated as shown in Equation 22.

$$a+b+c+d=1$$
$$a=0.29, b=0.26, c=0.24, d=0.21$$
$$a+b+c+d\times 10 = a+b+c\times 10 = a+b\times 10 = a\times 10 = 2.9 \quad \text{<Equation 22>}$$

That is, the time for performing the whole simulation may be 2.9. Thus, in the case of employing an optimal distribution equation, time efficiency may be improved compared to distributing the simulation scenario divided into equal parts to each processor.

Figure 6:
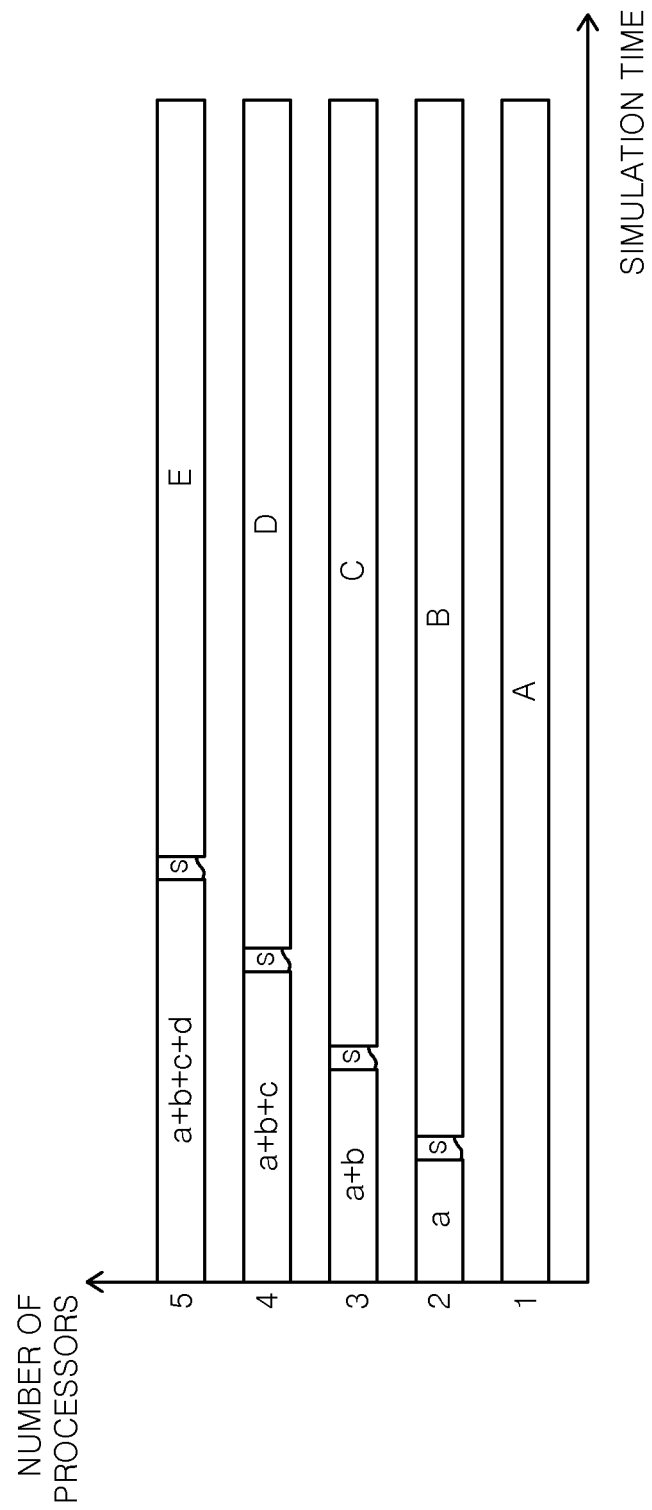
FIG. 6 illustrates an example of employing an optimal distribution equation in a method of performing a simulation according to one or more embodiments such as the example of FIG. 5, in which an optimal distribution equation is employed if a number of processors is increased.

FIG. 6 illustrates an example of employing an optimal distribution equation in a method of performing a simulation according to one or more embodiments such the example of FIG. 5, in which an optimal distribution equation is employed if a number of processors is increased.

It is assumed that five processors are used for a simulation, and a fast simulation may be performed ten times faster than a high-detail simulation for a same part. Additionally, in order to compare between times for performing a simulation, a time for executing the simulation scenario by performing a fast simulation is assumed to be 1. In comparison with a whole simulation time, a time for generating a snapshot may be ignored.

A ratio of a first part, from among parts that are obtained by employing the optimal distribution equation, to the simulation scenario may be obtained by using Equation 23.

$$\frac{\frac{1}{10}\left(1-\frac{1}{10}\right)^{1-1}}{1-\left(1-\frac{1}{10}\right)^5} \approx 24\%  \quad \text{(Equation 23)}$$

(where M=10, N=5, and x=1 are substituted into the optimal distribution equation)

A ratio of a second part, from among parts that are obtained by employing the optimal distribution equation, to the simulation scenario may be obtained by using Equation 24.

$$\frac{\frac{1}{10}\left(1-\frac{1}{10}\right)^{2-1}}{1-\left(1-\frac{1}{10}\right)^5} \approx 22\%  \quad \text{(Equation 24)}$$

(where M=10, N=5, and x=2 are substituted into the optimal distribution equation)

A ratio of a third part, from among parts that are obtained by employing the optimal distribution equation, to the simulation scenario may be obtained by using Equation 25.

$$\frac{\frac{1}{10}\left(1-\frac{1}{10}\right)^{3-1}}{1-\left(1-\frac{1}{10}\right)^5} \approx 20\%  \quad \text{(Equation 25)}$$

(where M=10, N=5, and x=3 are substituted into the optimal distribution equation)

A ratio of a fourth part, from among parts that are obtained by employing the optimal distribution equation, to the simulation scenario may be obtained by using Equation 26.

$$\frac{\frac{1}{10}\left(1-\frac{1}{10}\right)^{4-1}}{1-\left(1-\frac{1}{10}\right)^5} \approx 18\%  \quad \text{(Equation 26)}$$

(where M=10, N=5, and x=4 are substituted into the optimal distribution equation)

A ratio of a fifth part, from among parts that are obtained by employing the optimal distribution equation, to the simulation scenario may be obtained by using Equation 27.

$$\frac{\frac{1}{10}\left(1-\frac{1}{10}\right)^{5-1}}{1-\left(1-\frac{1}{10}\right)^5} \approx 16\%  \quad \text{(Equation 27)}$$

(where M=10, N=5, and x=5 are substituted into the optimal distribution equation)

As a result, a time for performing the whole simulation may be calculated as shown in Equation 28.

$a+b+c+d+e=1$ $a=0.24, b=0.22, c=0.20, d=0.18, e=0.16$ $a+b+c+d+e\times10=a+b+c+d\times10=a+b+c\times10$ $=a+b\times10=a\times10=2.4$  <Equation 28>

That is, the time for performing the whole simulation may be 2.4. Thus, in the case of employing an optimal distribution equation, time efficiency may be improved compared to distributing the simulation scenario divided into equal parts to each processor. Additionally, by increasing the number of processors that are used for a simulation, even though a minimum number of snapshots may be increased, the time for performing the whole simulation may be reduced.

Figure 7:
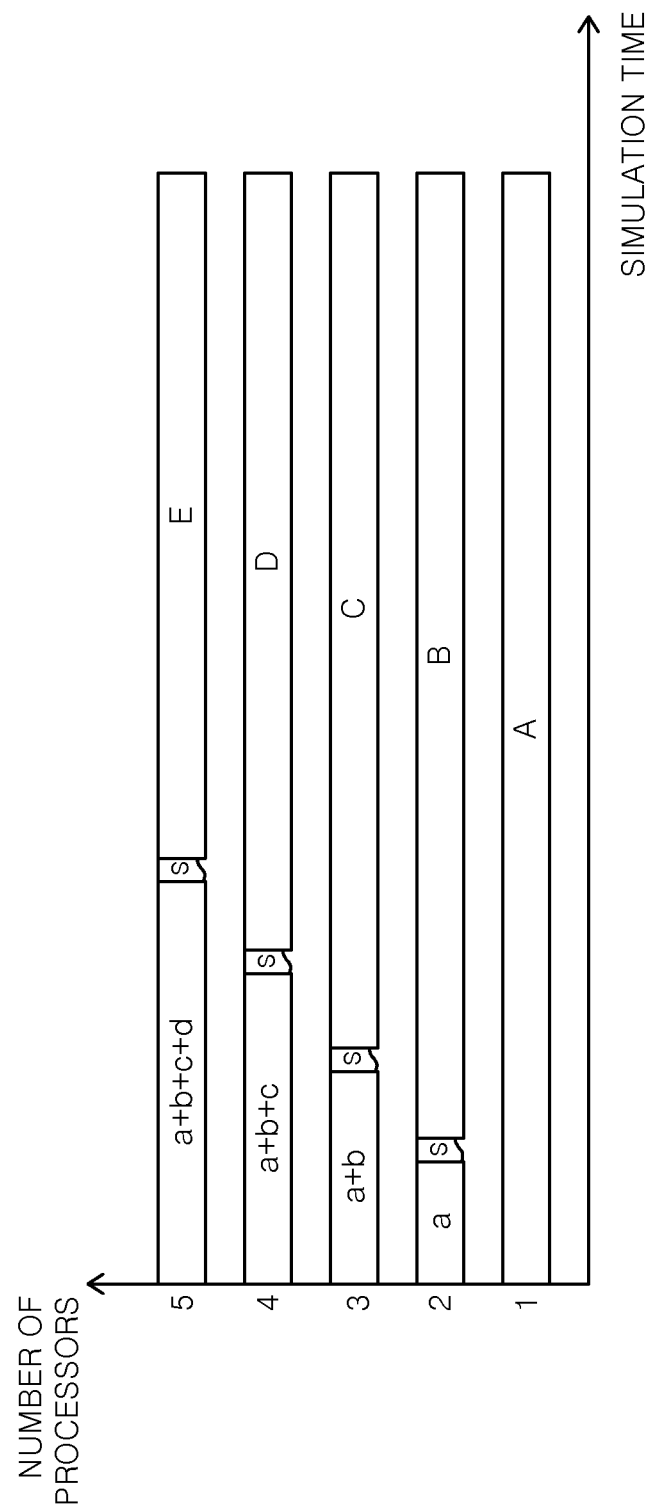
FIG. 7 illustrates an example of employing an optimal distribution equation in a method of performing a simulation according to one or more embodiments such as the example of FIG. 5, in which an optimal distribution equation is employed, if a difference in speed between a high-speed simulation and a high-detail simulation is different from a difference thereof shown in FIG. 5.

FIG. 7 illustrates an example of employing an optimal distribution equation in a method of performing a simulation according to one or more embodiments such as the example of FIG. 5, in which an optimal distribution equation is employed, if a difference in speed between a high-speed simulation and a high-detail simulation is different from a difference thereof shown in FIG. 5.

It is assumed that four processors are used for a simulation, and unlike the embodiments described above, a fast simulation may be performed eight times faster than a high-detail simulation for a same part. Additionally, in order to compare between times for performing a simulation, a time for executing the simulation scenario by performing a fast simulation is assumed to be 1. In comparison with a whole simulation time, a time for generating a snapshot may be ignored.

A ratio of a first part, from among parts that are obtained by employing the optimal distribution equation, to the simulation scenario may be obtained by using Equation 29.

$$\frac{\frac{1}{8}\left(1-\frac{1}{8}\right)^{1-1}}{1-\left(1-\frac{1}{8}\right)^4} \approx 30\%  \quad \text{(Equation 29)}$$

(where M=8, N=4, and x=1 are substituted into the optimal distribution equation)

A ratio of a second part, from among parts that are obtained by employing the optimal distribution equation, to the simulation scenario may be obtained by using Equation 30.

$$\frac{\frac{1}{8}\left(1-\frac{1}{8}\right)^{2-1}}{1-\left(1-\frac{1}{8}\right)^4} \approx 27\%  \quad \text{(Equation 30)}$$

(where M=8, N=4, and x=2 are substituted into the optimal distribution equation)

A ratio of a third part, from among parts that are obtained by employing the optimal distribution equation, to the simulation scenario may be obtained by using Equation 31.

$$\frac{\frac{1}{8}\left(1-\frac{1}{8}\right)^{3-1}}{1-\left(1-\frac{1}{8}\right)^4} \approx 23\%  \quad \text{(Equation 31)}$$

(where M=8, N=4, and x=3 are substituted into the optimal distribution equation)

A ratio of a fourth part, from among parts that are obtained by employing the optimal distribution equation, to the simulation scenario may be obtained by using Equation 32.

$$\frac{\frac{1}{8}\left(1-\frac{1}{8}\right)^{4-1}}{1-\left(1-\frac{1}{8}\right)^4} \approx 20\%  \qquad \text{(Equation 32)}$$

(where M=8, N=4, and x=4 are substituted into the optimal distribution equation)

As a result, the time for performing the whole simulation may be calculated as shown in Equation 33.

$$a+b+c+d=1$$

$$a=0.30,\ b=0.27,\ c=0.23,\ d=0.20$$

$$a+b+c+d\times 8 = a+b+c\times 8 = a+b\times 8 = a\times 8 = 2.4 \qquad \text{<Equation 33>}$$

That is, the time for performing the whole simulation is 2.4.

As a reference, the time for performing a simulation in the embodiment of FIG. 7 may not be compared to the times for performing the simulations in the embodiments shown in FIGS. 3 through 6. This is because, whereas a fast simulation is assumed to be performed ten times faster than a high-detail simulation for a same part in the embodiments shown in FIGS. 3 through 6, a fast simulation is assumed to be performed eight times faster than a high-detail simulation for a same part in the embodiments shown in FIG. 7. Accordingly, due to a difference between such assumptions, even though a time for executing a simulation scenario by performing a fast simulation is assumed to be 1 in both the embodiments shown in FIG. 3 through 6 and the embodiment shown in FIG. 7, the same criteria may not be applied to the embodiments shown in FIG. 3 through 6, and the embodiment shown in FIG. 7.

Figure 8:
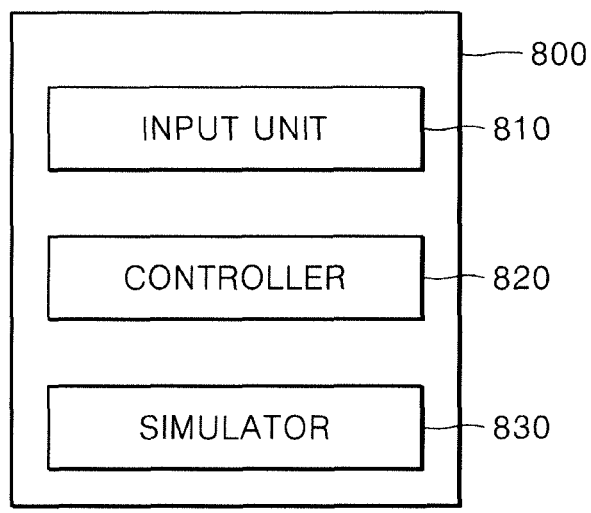
FIG. 8 is a block diagram of an apparatus for performing a simulation by using a plurality of processors in parallel, according to one or more embodiments.

FIG. 8 is a block diagram of an apparatus 800 for performing a simulation by using a plurality of processors in parallel, according to one or more embodiments.

The apparatus 800 may include an input unit 810, a controller 820, and a simulator 830. The input unit 810 may receive an input of a simulation scenario. According to one or more embodiments, the simulation scenario may be a program. If an input program is an uncompiled program, the apparatus 800 may further include a compiler for translating the program into machine language.

The controller 820 may divide the simulation scenario into N parts, and thus distribute the N parts of the divided simulation scenario to each of N processors. According to one or more embodiments, the controller 820 may divide the simulation scenario into N parts of equal amount, and distribute the N parts to each processor. According to one or more embodiments, the controller 820 may divide the simulation scenario according to an optimal distribution equation, and thus may distribute parts of the divided simulation scenario to each processor.

Additionally, the controller 820 may collect performance information that may be obtained as a result of performing the high-detail simulation. Additionally, the controller 820 may generate performance statistics, based on the performance information.

The simulator 830 may perform a high-detail simulation by using a first processor that may include a beginning part of the divided simulation scenario, perform a fast simulation by using each of N−1 processors among N processors, other than the first processor, and based on a snapshot that is generated after the fast simulation is finished, perform a high-detail simulation by using each of the N−1 processors.

According to one or more embodiments, if the simulation scenario is a program, the simulator 830 may execute the program on a processor.

According to one or more embodiments, the fast simulation may be a functional simulation such as, for example, an instruction-set simulation. For example, a simulation that may be executed with regard to a mirco-architecture may be executed on an instruction-set simulation. The high-detail simulation may include, for example, a cycle accurate simulation, a pipe accurate simulation, or a register-transfer level simulation, but is not limited thereto.

According to one or more embodiments, the apparatus 800 may further include an output unit (not illustrated) for outputting a result of performing a simulation. The output unit may be a display apparatus that is connected to an external console. In this case, the output unit may visually display performance statistics on a display.

According to one or more embodiments, the apparatus 800 may further include a storage unit (not illustrated) for storing collected performance information. The storage unit may further store performance statistics that may be generated based on the performance information. Additionally, the storage unit may store a snapshot that may be generated in a process of performing a fast simulation.

As described above, according to the one or more embodiments, generation of snapshots may be reduced, and transmission of snapshots between processors may no longer be performed. Accordingly, overhead may be reduced, and a simulation may be accelerated.

Additionally, efficiency of a multi-pass simulation may be optimized by using an optimal distribution equation.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method for performing of a simulation by using N processors in parallel (where the N is an integer equal to or greater than 2), the method comprising:
   dividing, by a controller, a simulation scenario into N parts;
   distributing, by a controller, the N parts to each of the N processors, respectively;
   performing a high-detail simulation by using a first processor among the N processors to which a first part among the N parts that includes a beginning part of the divided simulation scenario is distributed;
   performing N−1 fast simulations of N−1 parts among the N parts, respectively, using each of N−1 processors among the N processors, other than the first processor;
   generating N−1 snapshots of the N−1 parts among the N parts, respectively, using each of the N−1 processors among the N processors other than the first processor, after the N−1 fast simulations are finished, respectively; and
   performing N−1 high-detail simulations of the N−1 parts among the N parts, respectively, using each of the N−1 processors other than the first processor, based on each of the N−1 snapshots.

2. The method of claim 1, wherein the simulation scenario is a program, and at least one of the performing of a high-detail simulation, the performing of N−1 fast simulations and the performing of N−1 high-detail simulations comprises executing the program on the N processors.

3. The method of claim 2, wherein the fast simulation is an instruction-set simulation.

4. The method of claim 3, wherein each snapshot is generated from data and instruction trace information that are obtained as a result of performing the instruction-set simulation.

5. The method of claim 2, wherein the high-detail simulation is a cycle accurate simulation.

6. The method of claim 5, further comprising:
   collecting performance information that is obtained as a result of the performing of each high-detail simulation; and
   generating performance statistics, based on the performance information,
   wherein the performance statistics comprises at least one from among a number of all cycles that are necessary for executing the program, an average number of cycles for executing an instruction of the program, cache miss information, and stall cycle information.

7. The method of claim 1, wherein the dividing of the simulation scenario into N parts is performed so that a ratio of an $x^{th}$ part among the N parts to the simulation scenario complies with an optimal distribution equation shown below $$\frac{\frac{1}{M}\left(1-\frac{1}{M}\right)^{x-1}}{1-\left(1-\frac{1}{M}\right)^N} \quad \text{⟨Optimal distribution equation⟩}$$

(wherein the fast simulation is M times faster than the high-detail simulation, and where X is an integer equal to or greater than 1 and equal to or less than N).

8. The method of claim 1, wherein the performing of an $x^{th}$ fast simulation comprises performing the fast simulation for precedent parts among the N parts, which come before an $x^{th}$ part among the N parts in the simulation scenario, and the performing of an $x^{th}$ high-detail simulation comprises performing the high-detail simulation for the $x^{th}$ part.

9. The method of claim 1, wherein a number of the processors is determined based on a user input.

10. The method of claim 1, further comprising:
    collecting performance information that is obtained as a result of the performing of each high-detail simulation; and
    outputting the collected performance information.

11. An apparatus for performing a simulation by using N processors in parallel (where the N is an integer equal to or greater than 2), the apparatus comprising:
    a memory storing instructions and a simulation scenario; and
    a controller configured to execute the stored instructions to:
    divide the simulation scenario into N parts and distribute the N parts to each of the N processors, respectively; a first processor among the N processors configured to execute a first part among the N parts to perform a high-detail simulation, wherein the first part includes a beginning part of the simulation scenario; and
    each of N−1 processors among the N processors, other than the first processor configured to execute each of N−1 parts among the N parts other than the first part to:
    perform a fast simulation,
    generate a snapshot after the fast simulation is finished and
    perform a high-detail simulation based on the snapshot.

12. The apparatus of claim 11, wherein the simulation scenario is a program, and the N processors executes the program on the N processors.

13. The apparatus of claim 12, wherein the fast simulation is an instruction-set simulation.

14. The apparatus of claim 13, wherein each snapshot is generated from data and instruction trace information that are obtained as a result of performing the instruction-set simulation.

15. The apparatus of claim 12, wherein the high-detail simulation is a cycle accurate simulation.

16. The apparatus of claim 15, wherein the controller collects performance information that is obtained as a result of the high-detail simulation; and generates performance statistics, based on the performance information, wherein the performance statistics comprises at least one from among a number of all cycles that are necessary for executing the program, an average number of cycles for executing an instruction of the program, cache miss information, and stall cycle information.

17. The apparatus of claim 11, wherein the controller divides the simulation scenario into N parts so that a ratio of an $x^{th}$ part among the N parts to the simulation scenario complies with an optimal distribution equation shown below $$\frac{\frac{1}{M}\left(1-\frac{1}{M}\right)^{x-1}}{1-\left(1-\frac{1}{M}\right)^N} \quad \text{(optimal distribution equation)}$$

(wherein the fast simulation is M times faster than the high-detail simulation, and where X is an integer equal to or greater than 1 and equal to or less than N).

18. The apparatus of claim 11, wherein the first processor performs an $x^{th}$ fast simulation for precedent parts among the N parts, which come before an $x^{th}$ part among the N parts in the simulation scenario, and performs an $x^{th}$ high-detail scenario for the $x^{th}$ part.

19. The apparatus of claim 11, wherein the controller collects performance information that is obtained as a result of the high-detail simulation, further comprising an output unit for outputting the collected performance information.

20. A non-transitory computer readable recording medium having stored thereon a computer program which is executable by a computer to perform a method of performing a simulation by using N processors in parallel (where the N is an integer equal to greater than 2),comprising:

dividing a simulation scenario into N parts;

distributing the N parts to each of the N processors, respectively;

performing a high-detail simulation by using a first processor among the N processors to which a first part among the N parts that includes a beginning part of the divided simulation scenario is distributed;

performing N−1 fast simulations of N−1 parts among the N parts, respectively, using each of N−1 processors among the N processors, other than the first processor;

generating N−1 snapshots of the N−1 parts among the N parts, respectively, using each of the N−1 processors among the N processors other than the first processor, after the N−1 fast simulations are finished; and performing N−1 high-detail simulations of the N−1 parts among the N parts, respectively, using each of the N−1 processors other than the first processor, based on each of the N−1 snapshots.

* * * * *